United States Patent [19]

Watts

[11] Patent Number: 5,703,592

[45] Date of Patent: Dec. 30, 1997

[54] METHOD AND APPARATUS FOR ESTIMATING THE DETECTION RANGE OF A RADAR

[75] Inventor: Simon Watts, Surrey, England

[73] Assignee: Racal Radar Defence Systems Limited, Bracknell, England

[21] Appl. No.: 583,508

[22] Filed: Jan. 5, 1996

[30] Foreign Application Priority Data

Jan. 17, 1995 [GB] United Kingdom ............ 9500878

[51] Int. Cl.$^6$ ..................................... G01S 7/34
[52] U.S. Cl. ................................ 342/93; 342/159
[58] Field of Search ............... 342/93, 159, 103, 342/91, 162

[56] References Cited

U.S. PATENT DOCUMENTS

| | | | |
|---|---|---|---|
| 3,946,382 | 3/1976 | Kossiakoff et al. | 342/93 |
| 4,104,633 | 8/1978 | Donahue et al. | 342/93 |
| 4,845,500 | 7/1989 | Cornett et al. | 342/90 |
| 5,038,145 | 8/1991 | DeCesare et al. | 342/93 |
| 5,337,055 | 8/1994 | Ghignoni | 342/93 |
| 5,465,095 | 11/1995 | Bryant | 342/159 |
| 5,614,909 | 3/1997 | Komatsu et al. | 342/70 |
| 5,617,098 | 4/1997 | Koyanagi et al. | 342/70 |

OTHER PUBLICATIONS

IEE Proceedings, vol. 137, Pt.F, No. 2, Apr. 1990, pp. 51–77.
IEEE International Conference, Radar 90, "Empirical Models for Detection Prediction in K–Distribution Radar Sea Clutter", S. Watts & D.C. Wicks.

*Primary Examiner*—John B. Sotomayor
*Attorney, Agent, or Firm*—Evenson, McKeown, Edwards & Lenahan, PLLC

[57] ABSTRACT

A method and apparatus estimate the detection range $R_1$ of a radar in the presence of noise and clutter. The radar return signals from a range cell under test and from a plurality of surrounding range cells on either side of the range cell under test are measured. From the values of the return signals from the surrounding cells, a factor $\alpha$ is determined. The mean value of those signals is then multiplied to form a threshold value for determining the presence or absence of a target. A desired false alarm rate is maintained, however. A number of radar return signals sufficient substantially to average out local variations in clutter are used to determine a mean clutter value $m_c$. A value which is a function of $\alpha$ and $m_c$ is output as the estimate of detection range $R_1$.

16 Claims, 1 Drawing Sheet

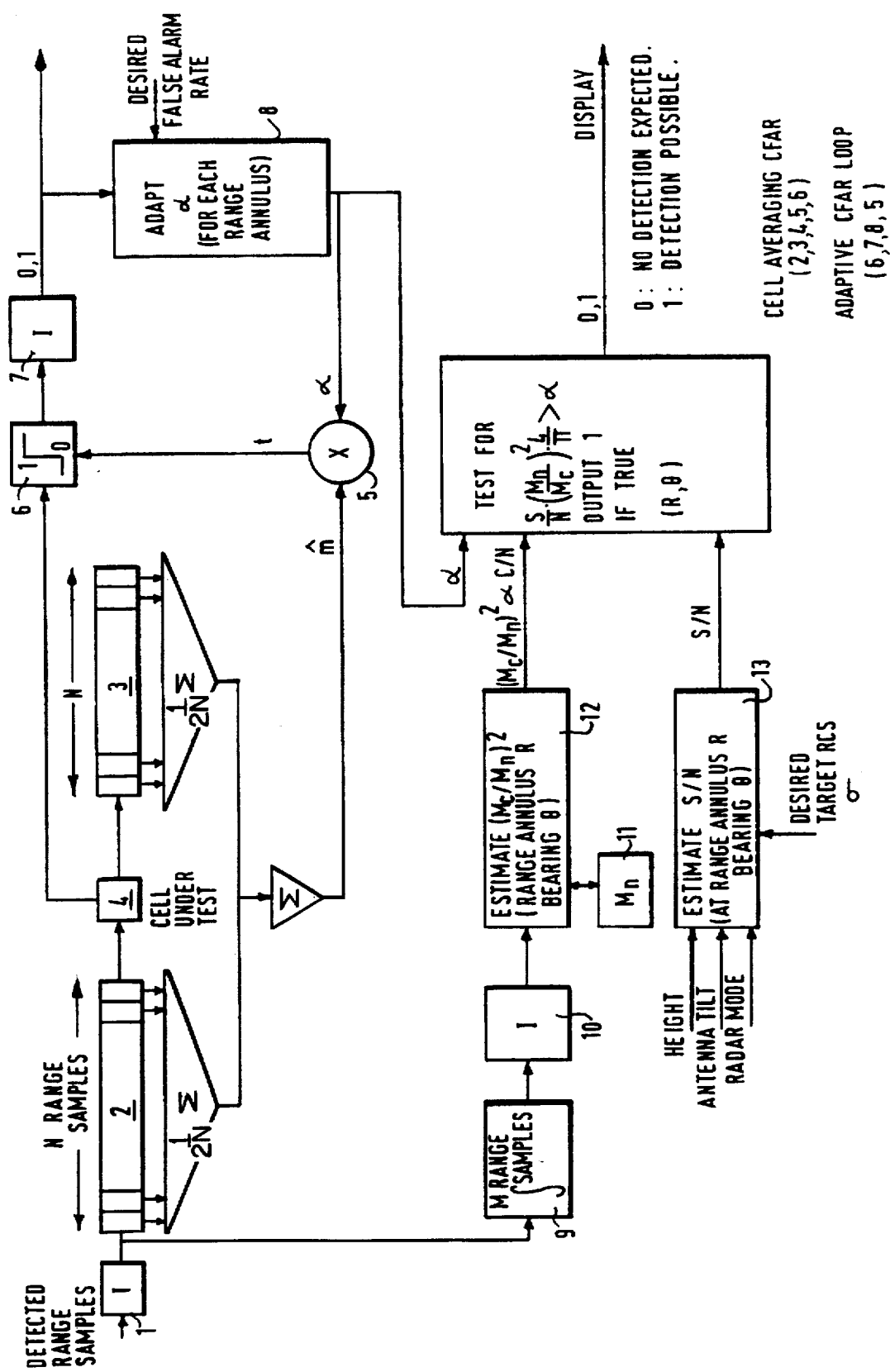

METHOD AND APPARATUS FOR ESTIMATING THE DETECTION RANGE OF A RADAR

BACKGROUND OF THE INVENTION

1. Field of the Invention

This invention relates to a method and apparatus for estimating the detection range of a radar. The invention is particularly applicable to a radar, for example, an airborne radar, for scanning the surface of the sea or other areas of water, though it is applicable to other types of radar also.

The targets which the radar is to detect have to be identified against a background of noise and clutter. This noise is largely internal noise arising within the detection circuitry of the radar itself, though it may also include a component due to radiation originating in space. Such noise has Gaussian amplitude statistics. The term "clutter" refers to unwanted echoes from objects other than the targets which it is desired to detect. In the case of a radar which scans the surface of a body of water, such clutter arises to a large extent from water waves. It is referred to herein as "sea clutter", though it is to be understood that similar clutter is also produced by the surface of a lake. Unlike noise, the magnitude and amplitude statistics of clutter are often a priori unknown. Accordingly, whereas allowance for the background of noise when detecting targets is, at least in principle, straightforward, the same is not true as far as clutter is concerned.

2. Description of Related Art

It has been found that the amplitude statistics of the envelope of many types of clutter returns, especially sea clutter, can be described by the compound K-distribution (see IEE proceedings, Vol 137, Pt.F, No. 2, April 1990, pp 51–77). For target returns in this type of clutter, assuming thresholding following envelope detection, the signal-to-clutter power ratio $(S/C)_t$ required for 50% detection has been found (see IEEE International Conference, Radar 90, Empirical Models for detection prediction in K-distribution radar sea clutter, S. Watts and D.C. Wicks) to be given by:

$$(S/C)_t = \alpha \cdot f(v) \tag{1}$$

where $f(v)$ is a function of the amplitude statistics and $\alpha$ is given by $$\alpha = \frac{t^2}{m_c^2}$$

i.e. the ratio, squared, of the threshold $t$ to the mean clutter signal level $m_c$, such that the threshold $t$ gives the desired probability of false alarm $(P_{fa})$ for the clutter returns of interest. The actual value of the function $f(v)$ will depend on the detector law of the radar receiver. The original example described in the Radar 90 paper implied a linear detector law but the idea is applicable to any detector law.

If it were possible to estimate the actual value of S/C that a target of given size would achieve at any point in the radar search area, then a prediction of detection range could be made. Target detections could occur at those points where the predicted actual S/C exceeded the required value derived from equation 1.

SUMMARY OF THE INVENTION

The present invention is based on the idea that the actual value of S/C should be estimated from the actual values of C/N (clutter to noise) observed in the radar and the values of S/N (signal to noise) predicted in the radar, for the area of interest. The mean noise level can be measured whilst the radar is in standby mode and stored for future use. If the estimated mean clutter signal level following a linear detector is $m_c$, and the mean noise level is $m_n$, then $$(C/N) = \left( \frac{m_c}{m_n} \right)^2 \cdot \frac{\pi}{4} \cdot [f(v)]^{-1} \tag{2}$$

The S/N for a given target size at any point in the radar search area can be estimated, using the radar range equation, from the knowledge of the radar parameters, the range to the target and the antenna gain in the direction of the target:

$$(S/N) = \sigma K_r G^2 / R^4 \tag{3}$$

where $K_r$: constant determined by the radar operating parameters and characteristics R: range to the target G: antenna gain in the direction of the target σ: rcs (radar cross section) of the target.

The factor $K_r$ can be set approximately by previous calibration and characterization of the radar. The range, R, is known. The antenna gain G may be more difficult to estimate. Assuming that the antenna is on a 3-axis stabilised mounting, it may be possible to determine the tilt angle of the antenna relative to the horizon and the depression angle (or elevation angle) in the direction of the target (using knowledge of the range and antenna height relative to the target). Previous measurements of the antenna gain pattern will then be sufficient to estimate the approximate value of G. For less fully stabilised antennas the problem is more complex but the principle is the same. The above discussion assumes a relatively flat terrain. For some applications, especially ground radars in very hilly terrain, it may be necessary to incorporate a knowledge of ground height to determine the elevation or depression angle to the target relative to the antenna boresight.

The value of σ is selected depending on the size of targets for which the radar is looking. For example, a value of $1m^2$ might be selected, in which case the method of the invention would be operating to determine the range at which targets having a radar cross section of at least $1m^2$ were detectable.

Using equations (2) and (3), the expected value of S/C for a target at any point in the radar scan area can be determined. For the probability of detection to exceed 50%, the expected value of S/C must exceed the threshold value $(S/C)_t$.

In other words $$(S/N) + (C/N) > (S/C)_t$$

$$\frac{K_r \sigma G^2}{R^4} \cdot \left( \frac{m_n}{m_c} \right)^2 \cdot \frac{4}{\pi} \cdot f(v) > \alpha f(v)$$

or $$\frac{K_r \sigma G^2}{R^4} \cdot \left( \frac{m_n}{m_c} \right)^2 \cdot \frac{4}{\pi} > \alpha \tag{4}$$

Taking $R_1$ as the detection range, this can be expressed as:

$$R_l = k \left( \frac{1}{am_c^2} \right)^{1/4}, \text{ where } k = \left( K_r m_n^2 \sigma G^2 \frac{4}{\pi} \right)^{1/4}$$

It will be noted that equations (4) and (5) do not contain the term f(v). Thus, it can be applied without having to know the precise amplitude statistics of the clutter. Its application does of course assume that the clutter (can be described), at least approximately, by a compound K-distribution.

Thus, according to the present invention there is provided a method of estimating the detection range $R_1$ of a radar in the presence of noise and clutter, which comprises measuring the radar return signals from a range cell under test and from a plurality of surrounding range cells on either side of the range cell under test, determining from the values of the return signals from the surrounding cells a factor $\alpha$ by which the mean value of those signals is to be multiplied to form a threshold value for determining the presence or absence of a target, whilst maintaining a desired false alarm rate, determining from a number of radar return signals sufficient substantionally to average out local variations in clutter a mean clutter value $m_c$, and outputting as the estimate of detection range $R_1$ a value which is a function of $\alpha$ and $m_c$. Preferably $R_1$ is given by $$k \left( \frac{1}{am_c^2} \right)^{1/2}$$

where k is a constant for given values of the radar antenna gain G in the direction of the target, the mean noise level $m_n$ and minimum radar cross section $\sigma$ of a target which is to be detectable. More particularly, $$k = \left( K_r m_n^2 \sigma G^2 \frac{4}{\pi} \right)^{1/4}$$

where $K_r$ is a constant determined by the radar operating parameters and characteristics.

The value of $\alpha$ may be obtained by a process in which it is continuously adjusted by a feedback loop to provide a desired false alarm rate (e.g. as described in IEE proceedings, vol. 137, Pt. F. No. 2, April 1990, pp 51–77, referred to above). Alternately it may be calculated directly from the values in the range cells.

The invention further provides an apparatus for estimating the detection range $R_1$ of a radar in the presence of noise and clutter, comprising means for measuring the radar return signals from a range cell under test and from a plurality of surrounding range cells on either side of the range cell under test, means for determining from the return signals from the surrounding cells a factor $\alpha$ by which the mean value of those signals is to be multiplied to form a threshold value for determining the presence or absence of a target whilst maintaining a desired false alarm rate, means for determining from a number of radar return signals sufficient substantially to average out local variations in clutter a mean clutter value $m_c$, and means for outputting as the estimate of detection range $R_1$ a value which is a function of $\alpha$ and $m_c$.

Preferably the results of the radar range estimation are continually displayed on the radar screen, for example by contour lines or different screen colours.

BRIEF DESCRIPTION OF THE DRAWINGS

An embodiment of the invention will now be described with reference to the accompanying drawing, which is a block diagram of circuitry suitable for carrying out this invention.

By way of introduction, it is to be understood that the radar to which the circuitry of the drawing is applied emits a train of pulses each typically having a length of, say about 30 ns, at a rate of, say, 2000 pulses/s. The return signal produced by these pulses can be sampled at intervals of, say 30 ns, though preferably oversampling is used, so that a 30 ns pulse would be sampled every, say, 20 ns. Each sample is detected, typically in a linear detector circuit, to give the amplitude of the envelope of the received signal. The samples may typically be digitised, although equivalent analogue circuits can be used. Each successive sample resulting from a given outgoing pulse represents the reflection of those pulses from a incrementally greater range than is represented by the previous sample, and is therefore referred to as a range sample.

DESCRIPTION OF THE PREFERRED EMBODIMENT

Each range sample therefore provides information about targets (and clutter) in a given range cell, ie, a volume at a given distance from the radar. Simultaneously, the radar beam scans in azimuth, either continuously through 360° or in some other way, depending on the nature of the search being conducted. It is to be appreciated that the description just given is of a radar which is conventional, and that the invention may be applied to radars which are other than just described.

Turning now to the circuit illustrated in the drawings, this shows firstly an optionally provided integrator 1 for integrating successive pulses returning from each given range position. It is to be understood that as the radar beam scans in azimuth a single target may produce a return from a succession of outgoing pulses for the same range cell. To take advantage of this the sample for each given range cell may be integrated over a moving window of, say 10 successive pulses. A greater or less number than 10 could be selected in dependence on the nature of the target to be detected.

The samples from successive range positions are then passed to a cell averaging CFAR circuit. The abbreviation CFAR denotes a constant false alarm rate, and a CFAR circuit is intended to maintain the probability $P_{fa}$ of a false alarm substantially constant. Typically $P_{fa}$ is of the order of $10^{-4}$ to $10^{-6}$. Transversal filters (2 and 3), integrate a number N (typically from, say, 5 to 50) of samples in range either side of the range cell (4) under test, in order to estimate the mean level of the surrounding radar returns (i.e. the surrounding radar clutter and thermal noise, in the absence of targets). The assumption is made that none of the range cells either side of the range cell under test contains a target. This will almost always be true. However, even if it is not, the mean level will not be greatly increased above what its value should be in the absence of a target.

The estimate of the surrounding mean level is multiplied in a multiplier (5) by a factor alpha $\alpha > 1$ to form a threshold t. The return in the cell under test is compared with the threshold t in a threshold circuit (6) and a detection is declared if the return exceeds the threshold. The outputs from threshold (6) are typically a binary 0 or 1. These outputs at each range position may optionally be integrated over two or more successive pulse returns in a binary integrator (7) which typically sets a second threshold to output a level 0 or 1.

The value of $\alpha$ used to determine the threshold t is set in a feedback circuit (8). The false alarm rate at the output of (6) or (7) is estimated by counting alarms over each of a number of range intervals (range annuli in the case of a scanning radar) and over a number of successive pulse returns. In each range interval a value of $\alpha$ is continuously adapted to maintain the required false alarm rate as the radar scans in azimuth. Typically this is achieved by incrementing $\alpha$ by a small amount every time there is an alarm and decrementing $\alpha$ by a different (larger) amount at fixed intervals. The increment and decrement values are chosen according to the desired false alarm rate and by this means an equilibrium value of $\alpha$ is achieved which adapts to changing clutter conditions.

The above circuits are well known but serve to describe how the values of $\alpha$, required for this application may be derived.

The ratio $(m_c/m_n)^2$ (proportional to C/N, see equation (2)) may also be estimated in a number of range intervals, with the estimate adapting as the radar look direction changes in azimuth. The range samples from the radar, or from the integrator (1) if provided, are input to a filter (9) which integrates over groups of M successive samples in range (say, 100 or 200) to estimate the average level of returns in that region. The average length M is typically larger than the value N used in the cell-averaging CFAR circuits (2,3) so that local fluctuations of the clutter are averaged out. These summed range samples may be further combined, in an integrator (10), over two or more, say five, successive pulse returns to provide an estimate of the mean clutter level $(m_c)$ over an area defined by the range annulus interval (M range samples) and the number of spokes (pulse intervals) in azimuth. The same circuit can be used when the radar is in standby mode, or when no pulse returns are being received, to estimate the noise level $(m_n)$ of the system. This is shown in store (11). A unit (12) is used to calculate $m_c$ in each range annulus, with the estimates being updated every radar pulse (or every five pulses, say) as the radar scans in azimuth.

The value of S/N is estimated in a unit (13) using a look-up table previously determined from the knowledge of the radar signal and noise levels under different operating conditions. Generally, the radar height, the tilt angle in elevation of the antenna and the radar mode will be required to estimate the S/N for a target of size $\sigma$ at a radar range R. The value of $\sigma$ is input by the operator, depending on radar cross-section of the targets whose detection range it is desired to estimate.

A circuit (14) calculates $(S/N).(m_r/m_c)^2.(4/\pi)$ and compares this with the value of $\alpha$ for each range annulus and for successive pulse returns (or groups of pulse returns). Regions where the probability of detection of a given target size, $\sigma$, is estimated to exceed 50% can then be displayed to the operator, using, say, different background colours on a PPI (plan position indicator) to denote different ranges at which such detection is possible. Alternately, contour lines can be used to denote the boundaries between areas where different detection ranges exist. The display enables the operator to see how the detection range varies over the area being surveyed by the radar, and if his concern is with an area where the range is undesirably short it may enable him to consider adjustments to the operation of the radar which will bring the area of concern to where the range of detection is greater.

Various modification may be made to the embodiment described. One arises from the fact that $K_r$ includes a component representing the value of $m_n$, and that $m_n$ has to be known in order to calculate $K_r$. Accordingly, if the value of $K_r$ in equation (4) is replaced by $K_r'=K_rm_n$, the input of $m_n$ separately at (11) is not necessary.

A second modification is to dispense with the feedback circuit (8) and to calculate the value of $\alpha$ directly from the values of the incoming range samples. This is possible, at least in theory, because the values of the range samples contain information not only about the mean value but also about the distribution of the variations of the value from the mean. In effect, there is the information here which would enable a graph to be plotted of the frequency with which a given value of the range sample amplitude occurs versus that value. Armed with such information, the value of $\alpha$ needed to produce the desired value of $P_{fa}$ can be calculated. In order to effect this calculation it is necessary to extract not only the mean value, but also the mean square value, i.e. both the first and second moments. Mathematically, this is entirely straightforward, and those skilled in this art can readily design circuitry to carry out the procedure. However, the process is comparatively intensive in real time, and may require greater computer power than it is practical to employ under the kinds of conditions where the radars concerned are commonly used. Also, the number of range samples used in the calculation at any given time is quite small, and the results may therefore not be sufficiently accurate, at least for some purposes.

I claim:

1. A method of estimating a detection range $R_1$ of a radar when noise and clutter are present comprising the steps of:
   measuring radar return signals from successive range cells under test,
   determining a factor $\alpha$ by which the mean value of those signals is to be multiplied to form a threshold value for determining the presence or absence of a target whilst maintaining a desired false alarm rate,
   determining, from a number of radar return signals sufficient substantially to average out local variations in clutter, a mean clutter value $m_c$, and
   outputting as the estimate of detection range $R_1$ a value which is a function of $\alpha$ and $m_c$.

2. A method as claimed in claim 1, wherein $R_1$ is given by $$k\left(\frac{1}{am_c^2}\right)^{1/2}$$

where k is a constant for given values of the radar antenna gain G in the direction of the target, the mean noise level $m_n$ and minimum radar cross section $\sigma$ of a target which is to be detectable.

3. A method as claimed in claim 2, wherein $$k=\left(K_r m_n^2 \sigma G^2 \frac{4}{\pi}\right)^{1/4}$$

where $K_r$ is a constant determined by the radar operating parameters and characteristics.

4. A method as claimed in claim 1, wherein the value of $\alpha$ is obtained by a process in which it is continuously adjusted by means of a feedback loop to provide said desired false alarm rate.

5. A method as claimed in claim 4, wherein the value of $\alpha$ is incremented by a small amount every time there is an alarm and is decremented by a larger amount at fixed intervals.

6. A method as claimed in claim 1, wherein the value of $\alpha$ is calculated directly from the values in the range cells.

7. A method as claimed in claim 1, and further comprising the step of measuring radar return signals from a plurality of surrounding range cells on either side of each range cell under test.

8. A method as claimed in claim 7, wherein said factor $\alpha$ is determined from values of said radar return signals from the surrounding range cells.

9. An apparatus for estimating a detection range $R_1$ of a radar when noise and clutter are present comprising:

means for measuring radar return signals from successive range cells under test, means for determining a factor $\alpha$ by which the mean value of those signals is to be multiplied to form a threshold value for determining the presence or absence of a target whilst maintaining a desired false alarm rate, means for determining, from a number of radar return signals sufficient substantially to average out local variations in clutter, a mean clutter value $m_c$, and means for outputting as the estimate of detection range $R_1$ a value which is a function of $\alpha$ and $m_c$.

10. An apparatus as claimed in claim 9, wherein said means for determining a factor $\alpha$ further comprises a feedback loop for continuous adjustment of the value of $\alpha$ to provide said desired false alarm rate.

11. An apparatus as claimed in claim 10, wherein said means for determining a factor $\alpha$ is adapted to increment the value of $\alpha$ every time there is an alarm and to decrement the value of $\alpha$ by a larger amount at fixed intervals.

12. An apparatus as claimed in claim 9, wherein said means for determining a factor $\alpha$ comprises means to calculate the value of $\alpha$ directly from the values in the range cells.

13. An apparatus as claimed in claim 9, further comprising a display adapted such that different colours are used to separate regions with different probabilities of detection for a given size of target.

14. An apparatus as claimed in claim 9, further comprising a display adapted such that regions with different probabilities of detection for a given size of target are separated by contour lines.

15. An apparatus as claimed in claim 9, wherein the means for measuring radar return signals also measures radar return signals from a plurality of surrounding range cells on either side of each range cell under test.

16. An apparatus as claimed in claim 15, wherein said factor $\alpha$ is determined from values of said radar return signals from the surrounding range cells.

\* \* \* \* \*